United States Patent
Bonan et al.

(10) Patent No.: US 7,292,692 B2
(45) Date of Patent: Nov. 6, 2007

(54) CONTENT SCRAMBLING WITH MINIMAL IMPACT ON LEGACY DEVICES

(75) Inventors: James Bonan, Wyckoff, NJ (US); Brant L. Candelore, Escondido, CA (US); Mark Kenneth Eyer, Woodinville, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 665 days.

(21) Appl. No.: 10/767,421

(22) Filed: Jan. 29, 2004

(65) Prior Publication Data

US 2004/0240668 A1 Dec. 2, 2004

Related U.S. Application Data

(60) Provisional application No. 60/457,192, filed on Mar. 25, 2003.

(51) Int. Cl.
*H04N 7/167* (2006.01)
(52) U.S. Cl. .............. 380/212; 380/200; 380/201; 713/160
(58) Field of Classification Search ............. 380/212, 380/201
See application file for complete search history.

(56) References Cited

U.S. PATENT DOCUMENTS

| | | |
|---|---|---|
| 3,852,519 A | 12/1974 | Court |
| 4,381,519 A | 4/1983 | Wilkinson et al. |
| 4,419,693 A | 12/1983 | Wilkinson |
| 4,521,853 A | 6/1985 | Guttag |
| 4,634,808 A | 1/1987 | Moerder |
| 4,700,387 A | 10/1987 | Hirata |
| 4,703,351 A | 10/1987 | Kondo |

(Continued)

FOREIGN PATENT DOCUMENTS

EP 0471373 2/1992

(Continued)

OTHER PUBLICATIONS

"How Networks Work—Milennium Edition"—pp. 88-89, Que Corporation, 2000.

(Continued)

*Primary Examiner*—Gilberto Barron, Jr.
*Assistant Examiner*—Samson Lemma
(74) *Attorney, Agent, or Firm*—Miller Patent Services; Jerry A. Miller

(57) ABSTRACT

An encryption arrangement for television programs or other digital programming consistent with certain embodiments sends content completely in-the-clear and also encrypts only a portion of the content required for full presentation of a television program. The arrangement allows interoperability between new TVs that can handle encryption and older TVs that cannot. Regulations prevent new TVs from receiving only the clear content. New TVs are made to descramble the encrypted portions of the content. Older legacy TVs can receive all the content in the clear. The encrypted portions are chosen so that dramatically less bandwidth is required as compared to full dual carriage of the content. Licensing provisions relating to the encryption technology can be used to control unauthorized use of content. This abstract is not to be considered limiting, since other embodiments may deviate from the features described in this abstract.

27 Claims, 4 Drawing Sheets

U.S. PATENT DOCUMENTS

| | | |
|---|---|---|
| 4,703,352 A | 10/1987 | Kondo |
| 4,710,811 A | 12/1987 | Kondo |
| 4,712,238 A | 12/1987 | Gilhousen et al. |
| 4,722,003 A | 1/1988 | Kondo |
| 4,739,510 A | 4/1988 | Jeffers et al. |
| 4,772,947 A | 9/1988 | Kondo |
| 4,785,361 A | 11/1988 | Brotby |
| 4,788,589 A | 11/1988 | Kondo |
| 4,815,078 A | 3/1989 | Shimura |
| 4,845,560 A | 7/1989 | Kondo et al. |
| 4,887,296 A | 12/1989 | Horne |
| 4,890,161 A | 12/1989 | Kondo |
| 4,914,515 A | 4/1990 | Van Luyt |
| 4,924,310 A | 5/1990 | von Brandt |
| 4,944,006 A | 7/1990 | Citta et al. |
| 4,953,023 A | 8/1990 | Kondo |
| 4,989,245 A | 1/1991 | Bennett |
| 4,995,080 A | 2/1991 | Bestler et al. |
| 5,018,197 A | 5/1991 | Jones et al. |
| 5,023,710 A | 6/1991 | Kondo et al. |
| 5,091,936 A | 2/1992 | Katznelson |
| 5,122,873 A | 6/1992 | Golin |
| 5,138,659 A | 8/1992 | Kelkar et al. |
| 5,142,537 A | 8/1992 | Kutner et al. |
| 5,144,662 A | 9/1992 | Welmer |
| 5,144,664 A | 9/1992 | Esserman et al. |
| 5,151,782 A | 9/1992 | Ferraro |
| 5,159,452 A | 10/1992 | Kinoshita et al. |
| 5,196,931 A | 3/1993 | Kondo |
| 5,208,816 A | 5/1993 | Seshardi et al. |
| 5,237,424 A | 8/1993 | Nishino et al. |
| 5,237,610 A | 8/1993 | Gammie et al. |
| 5,241,381 A | 8/1993 | Kondo |
| 5,247,575 A | 9/1993 | Sprague et al. |
| 5,258,835 A | 11/1993 | Kato |
| 5,319,707 A | 6/1994 | Wasilewski et al. |
| 5,319,712 A | 6/1994 | Finkelstein et al. |
| 5,325,432 A | 6/1994 | Gardeck et al. |
| 5,327,502 A | 7/1994 | Katata |
| 5,341,425 A | 8/1994 | Wasilewski et al. |
| 5,359,694 A | 10/1994 | Concordel |
| 5,379,072 A | 1/1995 | Kondo |
| 5,381,481 A | 1/1995 | Gammie et al. |
| 5,398,078 A | 3/1995 | Masuda et al. |
| 5,400,401 A | 3/1995 | Wasilewski et al. |
| 5,414,852 A | 5/1995 | Kramer et al. |
| 5,416,651 A | 5/1995 | Uetake et al. |
| 5,416,847 A | 5/1995 | Boze |
| 5,420,866 A | 5/1995 | Wasilewski |
| 5,428,403 A | 6/1995 | Andrew et al. |
| 5,434,716 A | 7/1995 | Sugiyama et al. |
| 5,438,369 A | 8/1995 | Citta et al. |
| 5,444,491 A | 8/1995 | Lim |
| 5,444,782 A | 8/1995 | Adams, Jr. et al. |
| 5,455,862 A | 10/1995 | Hoskinson |
| 5,469,216 A | 11/1995 | Takahashi et al. |
| 5,471,501 A | 11/1995 | Parr et al. |
| 5,473,692 A | 12/1995 | Davis |
| 5,481,554 A | 1/1996 | Kondo |
| 5,481,627 A | 1/1996 | Kim |
| 5,485,577 A | 1/1996 | Eyer et al. |
| 5,491,748 A | 2/1996 | Auld, Jr. et al. |
| 5,526,427 A | 6/1996 | Thomas et al. |
| 5,528,608 A | 6/1996 | Shimizume |
| 5,535,276 A | 7/1996 | Ganesan |
| 5,539,823 A | 7/1996 | Martin et al. |
| 5,539,828 A | 7/1996 | Davis |
| 5,553,141 A | 9/1996 | Lowry et al. |
| 5,555,305 A | 9/1996 | Robinson et al. |
| 5,561,713 A | 10/1996 | Suh |
| 5,568,552 A | 10/1996 | Davis |
| 5,574,787 A | 11/1996 | Ryan |
| 5,582,470 A | 12/1996 | Yu |
| 5,583,576 A | 12/1996 | Perlman et al. |
| 5,583,863 A | 12/1996 | Darr, Jr. et al. |
| 5,590,202 A | 12/1996 | Bestler et al. |
| 5,598,214 A | 1/1997 | Kondo et al. |
| 5,600,721 A | 2/1997 | Kitazato |
| 5,606,359 A | 2/1997 | Youden et al. |
| 5,608,448 A | 3/1997 | Smoral et al. |
| 5,615,265 A | 3/1997 | Coutrot |
| 5,617,333 A | 4/1997 | Oyamada et al. |
| 5,625,715 A | 4/1997 | Trew et al. |
| 5,629,981 A | 5/1997 | Nerlikar |
| 5,652,795 A | 7/1997 | Eillon et al. |
| 5,663,764 A | 9/1997 | Kondo et al. |
| 5,666,293 A | 9/1997 | Metz et al. |
| 5,696,906 A | 12/1997 | Peters et al. |
| 5,699,429 A | 12/1997 | Tamer et al. |
| 5,703,889 A | 12/1997 | Shimoda et al. |
| 5,717,814 A | 2/1998 | Abecassis |
| 5,726,702 A | 3/1998 | Hamaguchi et al. |
| 5,726,711 A | 3/1998 | Boyce |
| 5,732,346 A | 3/1998 | Lazaridis et al. |
| 5,742,680 A | 4/1998 | Wilson |
| 5,742,681 A | 4/1998 | Giachettie et al. |
| 5,751,280 A | 5/1998 | Abbott et al. |
| 5,751,743 A | 5/1998 | Takizawa |
| 5,751,813 A | 5/1998 | Dorenbos |
| 5,754,650 A | 5/1998 | Katznelson |
| 5,754,658 A | 5/1998 | Aucsmith |
| 5,757,417 A | 5/1998 | Aras et al. |
| 5,757,909 A | 5/1998 | Park |
| 5,768,539 A | 6/1998 | Metz et al. |
| 5,796,786 A | 8/1998 | Lee |
| 5,796,829 A | 8/1998 | Newby et al. |
| 5,796,840 A | 8/1998 | Davis |
| 5,802,176 A | 9/1998 | Audebert |
| 5,805,700 A | 9/1998 | Nardone et al. |
| 5,805,712 A | 9/1998 | Davis |
| 5,805,762 A | 9/1998 | Boyce et al. |
| 5,809,147 A | 9/1998 | De Lange et al. |
| 5,815,146 A | 9/1998 | Youden et al. |
| 5,818,934 A | 10/1998 | Cuccia |
| 5,825,879 A | 10/1998 | Davis |
| 5,850,218 A | 12/1998 | LaJoie et al. |
| 5,852,290 A | 12/1998 | Chaney |
| 5,852,470 A | 12/1998 | Kondo et al. |
| 5,870,474 A | 2/1999 | Wasilewski et al. |
| 5,894,320 A | 4/1999 | Vancelette |
| 5,894,516 A | 4/1999 | Brandenburg |
| 5,915,018 A | 6/1999 | Aucsmith |
| 5,917,830 A | 6/1999 | Chen et al. |
| 5,922,048 A | 7/1999 | Emura |
| 5,923,755 A | 7/1999 | Birch et al. |
| 5,930,361 A | 7/1999 | Hayashi et al. |
| 5,933,500 A | 8/1999 | Blatter et al. |
| 5,940,738 A | 8/1999 | Rao |
| 5,949,877 A | 9/1999 | Traw et al. |
| 5,949,881 A | 9/1999 | Davis |
| 5,963,909 A | 10/1999 | Warren et al. |
| 5,973,679 A | 10/1999 | Abbott et al. |
| 5,973,722 A | 10/1999 | Wakai et al. |
| 5,973,726 A | 10/1999 | Iijima et al. |
| 5,999,622 A | 12/1999 | Yasukawa et al. |
| 5,999,698 A | 12/1999 | Nakai et al. |
| 6,005,561 A | 12/1999 | Hawkins et al. |
| 6,011,849 A | 1/2000 | Orrin |
| 6,012,144 A | 1/2000 | Pickett |
| 6,016,348 A | 1/2000 | Blatter et al. |
| 6,021,199 A | 2/2000 | Ishibashi |
| 6,021,201 A | 2/2000 | Bakhle et al. |
| 6,026,164 A | 2/2000 | Sakamoto et al. |
| 6,028,932 A | 2/2000 | Park |

| | | | | | | |
|---|---|---|---|---|---|---|
| 6,049,613 | A | 4/2000 | Jakobsson | 6,466,671 | B1 | 10/2002 | Maillard et al. |
| 6,055,314 | A | 4/2000 | Spies et al. | 6,505,032 | B1 | 1/2003 | McCorkle et al. |
| 6,055,315 | A | 4/2000 | Doyle et al. | 6,505,299 | B1 | 1/2003 | Zeng et al. |
| 6,057,872 | A | 5/2000 | Candelore | 6,510,554 | B1 | 1/2003 | Gordon et al. |
| 6,058,186 | A | 5/2000 | Enari | 6,519,693 | B1 | 2/2003 | Debey |
| 6,058,192 | A | 5/2000 | Guralnick et al. | 6,526,144 | B2 | 2/2003 | Markandey et al. |
| 6,061,451 | A | 5/2000 | Muratani et al. | 6,529,526 | B1 | 3/2003 | Schneidewend |
| 6,064,748 | A | 5/2000 | Hogan | 6,543,053 | B1 | 4/2003 | Li et al. |
| 6,065,050 | A | 5/2000 | DeMoney | 6,549,229 | B1 | 4/2003 | Kirby et al. |
| 6,069,647 | A | 5/2000 | Sullivan et al. | 6,550,008 | B1 | 4/2003 | Zhang et al. |
| 6,070,245 | A | 5/2000 | Murphy, Jr. et al. | 6,557,031 | B1 | 4/2003 | Mimura et al. |
| 6,072,872 | A | 6/2000 | Chang et al. | 6,587,561 | B1 | 7/2003 | Sered et al. |
| 6,072,873 | A | 6/2000 | Bewick | 6,590,979 | B1 | 7/2003 | Ryan |
| 6,073,122 | A | 6/2000 | Wool | 6,640,145 | B2 | 10/2003 | Hoffberg et al. |
| 6,088,450 | A | 7/2000 | Davis et al. | 6,640,305 | B2 | 10/2003 | Kocher et al. |
| 6,105,134 | A | 8/2000 | Pinder et al. | 6,650,754 | B2 | 11/2003 | Akiyama et al. |
| 6,108,422 | A | 8/2000 | Newby et al. | 6,654,389 | B1 | 11/2003 | Brunheroto et al. |
| 6,115,821 | A | 9/2000 | Newby et al. | 6,678,740 | B1 | 1/2004 | Rakib et al. |
| 6,118,873 | A | 9/2000 | Lotspiech et al. | 6,681,326 | B2 | 1/2004 | Son et al. |
| 6,134,237 | A | 10/2000 | Brailean et al. | 6,684,250 | B2 | 1/2004 | Anderson et al. |
| 6,134,551 | A | 10/2000 | Aucsmith | 6,697,489 | B1 | 2/2004 | Candelore |
| 6,138,237 | A | 10/2000 | Ruben et al. | 6,697,944 | B1 | 2/2004 | Jones et al. |
| 6,148,082 | A | 11/2000 | Slattery et al. | 6,707,696 | B1 | 3/2004 | Turner et al. |
| 6,154,206 | A | 11/2000 | Ludtke | 6,714,650 | B1 | 3/2004 | Maillard et al. |
| 6,157,719 | A | 12/2000 | Wasilewski et al. | 6,754,276 | B1 | 6/2004 | Harumoto et al. |
| 6,181,334 | B1 | 1/2001 | Freeman et al. | 6,772,340 | B1 | 8/2004 | Peinado et al. |
| 6,185,369 | B1 | 2/2001 | Ko et al. | 6,788,690 | B2 | 9/2004 | Harri |
| 6,185,546 | B1 | 2/2001 | Davis | 6,788,882 | B1 | 9/2004 | Geer et al. |
| 6,189,096 | B1 | 2/2001 | Haverty | 6,826,185 | B1 | 11/2004 | Montanaro et al. |
| 6,192,131 | B1 | 2/2001 | Geer et al. | 6,883,050 | B1 | 4/2005 | Safadi |
| 6,199,053 | B1 | 3/2001 | Herbert et al. | 6,891,565 | B1 | 5/2005 | Dietrich |
| 6,204,843 | B1 | 3/2001 | Freeman et al. | 6,895,128 | B2 | 5/2005 | Bohnenkamp |
| 6,209,098 | B1 | 3/2001 | Davis | 6,904,520 | B1 | 6/2005 | Rosset et al. |
| 6,215,484 | B1 | 4/2001 | Freeman et al. | 6,917,684 | B1 | 7/2005 | Tatebayashi et al. |
| 6,222,924 | B1 | 4/2001 | Salomaki | 6,938,162 | B1 | 8/2005 | Nagai et al. |
| 6,223,290 | B1 | 4/2001 | Larsen et al. | 6,976,166 | B2 | 12/2005 | Herley et al. |
| 6,226,618 | B1 | 5/2001 | Downs | 7,039,802 | B1 | 5/2006 | Eskicioglu et al. |
| 6,229,895 | B1 | 5/2001 | Son et al. | 7,039,938 | B2 | 5/2006 | Candelore |
| 6,230,194 | B1 | 5/2001 | Frailong et al. | 7,065,213 | B2 | 6/2006 | Pinder |
| 6,230,266 | B1 | 5/2001 | Perlman et al. | 7,096,481 | B1 | 8/2006 | Forecast et al. |
| 6,236,727 | B1 | 5/2001 | Ciacelli et al. | 7,120,250 | B2 | 10/2006 | Candelore |
| 6,240,553 | B1 | 5/2001 | Son et al. | 7,124,303 | B2 | 10/2006 | Candelore |
| 6,246,720 | B1 | 6/2001 | Kutner et al. | 7,127,619 | B2 | 10/2006 | Unger et al. |
| 6,256,747 | B1 | 7/2001 | Inohara et al. | 7,139,398 | B2 | 11/2006 | Candelore et al. |
| 6,263,506 | B1 | 7/2001 | Ezaki et al. | 7,146,007 | B1 | 12/2006 | Maruo et al. |
| 6,266,416 | B1 | 7/2001 | Sigbjornsen et al. | 7,151,831 | B2 | 12/2006 | Candelore et al. |
| 6,266,480 | B1 | 7/2001 | Ezaki et al. | 7,151,833 | B2 | 12/2006 | Candelore et al. |
| 6,272,538 | B1 | 8/2001 | Holden et al. | 7,155,012 | B2 | 12/2006 | Candelore et al. |
| 6,278,783 | B1 | 8/2001 | Kocher et al. | 2001/0030959 | A1 | 10/2001 | Ozawa et al. |
| 6,289,455 | B1 | 9/2001 | Kocher et al. | 2001/0036271 | A1 | 11/2001 | Javed |
| 6,292,568 | B1 | 9/2001 | Akins, III et al. | 2001/0051000 | A1 | 12/2001 | Teshima |
| 6,292,892 | B1 | 9/2001 | Davis | 2002/0003881 | A1 | 1/2002 | Reitmeier et al. |
| 6,307,939 | B1 | 10/2001 | Vigarie | 2002/0021805 | A1 | 2/2002 | Schumann et al. |
| 6,311,012 | B1 | 10/2001 | Cho et al. | 2002/0026587 | A1 | 2/2002 | Talstra et al. |
| 6,324,288 | B1 | 11/2001 | Hoffman | 2002/0046406 | A1 | 4/2002 | Chelehmal et al. |
| 6,351,538 | B1 | 2/2002 | Uz | 2002/0047915 | A1 | 4/2002 | Misu |
| 6,351,813 | B1 | 2/2002 | Mooney et al. | 2002/0059425 | A1 | 5/2002 | Belfiore et al. |
| 6,377,589 | B1 | 4/2002 | Knight et al. | 2002/0066101 | A1 | 5/2002 | Gordon et al. |
| 6,378,130 | B1 | 4/2002 | Adams | 2002/0083317 | A1 | 6/2002 | Ohta et al. |
| 6,389,533 | B1 | 5/2002 | Davis et al. | 2002/0083438 | A1 | 6/2002 | So et al. |
| 6,389,537 | B1 | 5/2002 | Davis et al. | 2002/0097322 | A1 | 7/2002 | Monroe et al. |
| 6,415,031 | B1 | 7/2002 | Colligan et al. | 2002/0108035 | A1 | 8/2002 | Herley et al. |
| 6,415,101 | B1 | 7/2002 | deCarmo et al. | 2002/0116705 | A1 | 8/2002 | Perlman et al. |
| 6,418,169 | B1 | 7/2002 | Datari | 2002/0126890 | A1 | 9/2002 | Katayama et al. |
| 6,424,717 | B1 | 7/2002 | Pinder et al. | 2002/0129243 | A1* | 9/2002 | Nanjundiah ............. 713/160 |
| 6,430,361 | B2 | 8/2002 | Lee | 2002/0144260 | A1 | 10/2002 | Devara |
| 6,445,738 | B1 | 9/2002 | Zdepski et al. | 2002/0150238 | A1 | 10/2002 | Carny et al. |
| 6,449,718 | B1 | 9/2002 | Rucklidge et al. | 2002/0150239 | A1* | 10/2002 | Carney et al. ............. 380/37 |
| 6,452,923 | B1 | 9/2002 | Gerszberg et al. | 2002/0157115 | A1 | 10/2002 | Lu |
| 6,453,115 | B1 | 9/2002 | Boyle | 2002/0164022 | A1 | 11/2002 | Strasser et al. |
| 6,456,985 | B1 | 9/2002 | Ohtsuka | 2002/0170053 | A1 | 11/2002 | Peterka et al. |
| 6,459,427 | B1 | 10/2002 | Mao et al. | 2002/0184506 | A1 | 12/2002 | Perlman |
| 6,463,152 | B1 | 10/2002 | Takahashi | 2002/0194613 | A1 | 12/2002 | Unger |

| | | |
|---|---|---|
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 | 1/2003 | Ishtiaq et al |
| 2003/0021412 A1 | 1/2003 | Candelore et al. |
| 2003/0026423 A1 | 2/2003 | Unger et al. |
| 2003/0026523 A1 | 2/2003 | Unger et al. |
| 2003/0028879 A1 | 2/2003 | Gordon et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1* | 5/2003 | Candelore ................ 380/200 |
| 2003/0084284 A1 | 5/2003 | Ando et al. |
| 2003/0097662 A1 | 5/2003 | Russ et al. |
| 2003/0112333 A1 | 6/2003 | Chen et al. |
| 2003/0118243 A1 | 6/2003 | Sezer et al. |
| 2003/0123664 A1 | 7/2003 | Pedlow, Jr. et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1* | 8/2003 | Candelore et al. .......... 380/210 |
| 2003/0152226 A1 | 8/2003 | Candelore et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0047470 A1 | 3/2004 | Candelore |
| 2004/0049688 A1 | 3/2004 | Candelore |
| 2004/0049690 A1 | 3/2004 | Candelore et al. |
| 2004/0049691 A1 | 3/2004 | Candelore et al. |
| 2004/0049694 A1 | 3/2004 | Candelore |
| 2004/0064688 A1 | 4/2004 | Jacobs |
| 2004/0068659 A1 | 4/2004 | Diehl |
| 2004/0073917 A1 | 4/2004 | Pedlow, Jr. et al. |
| 2004/0078575 A1 | 4/2004 | Morten et al. |
| 2004/0081333 A1 | 4/2004 | Grab et al. |
| 2004/0083552 A1 | 5/2004 | Candelore |
| 2004/0086127 A1 | 5/2004 | Candelore |
| 2004/0088552 A1 | 5/2004 | Candelore |
| 2004/0088558 A1 | 5/2004 | Candelore |
| 2004/0091109 A1 | 5/2004 | Son et al. |
| 2004/0100510 A1 | 5/2004 | Milic-Frayling et al. |
| 2004/0123094 A1 | 6/2004 | Sprunk |
| 2004/0136532 A1 | 7/2004 | Pinder et al. |
| 2004/0139337 A1 | 7/2004 | Pinder et al. |
| 2004/0151314 A1 | 8/2004 | Candelore |
| 2004/0158721 A1 | 8/2004 | Candelore |
| 2004/0165586 A1 | 8/2004 | Read et al. |
| 2004/0172650 A1 | 9/2004 | Hawkins et al. |
| 2004/0181666 A1 | 9/2004 | Candelore |
| 2004/0187161 A1 | 9/2004 | Cao |
| 2004/0193550 A1 | 9/2004 | Siegal |
| 2004/0240668 A1 | 12/2004 | Bonan et al. |
| 2004/0247122 A1 | 12/2004 | Hobrock et al. |
| 2004/0261099 A1 | 12/2004 | Durden et al. |
| 2004/0267602 A1 | 12/2004 | Gaydos et al. |
| 2005/0004875 A1 | 1/2005 | Kontio et al. |
| 2005/0028193 A1 | 2/2005 | Candelore et al. |
| 2005/0036067 A1 | 2/2005 | Ryal et al. |
| 2005/0063541 A1 | 3/2005 | Candelore |
| 2005/0066357 A1 | 3/2005 | Ryal |
| 2005/0071669 A1 | 3/2005 | Medvinsky et al. |
| 2005/0094808 A1 | 5/2005 | Pedlow, Jr. et al. |
| 2005/0094809 A1 | 5/2005 | Pedlow, Jr. et al. |
| 2005/0097596 A1 | 5/2005 | Pedlow, Jr. |
| 2005/0097597 A1 | 5/2005 | Pedlow, Jr. et al. |
| 2005/0097598 A1 | 5/2005 | Pedlow, Jr. et al. |
| 2005/0097614 A1 | 5/2005 | Pedlow, Jr. et al. |
| 2005/0102702 A1 | 5/2005 | Candelore et al. |
| 2005/0129233 A1 | 6/2005 | Pedlow, Jr. |
| 2005/0141713 A1 | 6/2005 | Genevols |
| 2005/0169473 A1 | 8/2005 | Candelore |
| 2005/0192904 A1 | 9/2005 | Candelore |
| 2005/0198586 A1 | 9/2005 | Sekiguchi et al. |
| 2005/0259813 A1 | 11/2005 | Wasilewski et al. |
| 2005/0265547 A1 | 12/2005 | Strasser et al. |
| 2006/0115083 A1 | 6/2006 | Candelore et al. |
| 2006/0130119 A1 | 6/2006 | Candelore et al. |
| 2006/0130121 A1 | 6/2006 | Candelore et al. |
| 2006/0136976 A1 | 6/2006 | Coupe et al. |
| 2006/0153379 A1 | 7/2006 | Candelore et al. |
| 2006/0168616 A1 | 7/2006 | Candelore |
| 2006/0174264 A1 | 8/2006 | Candelore |
| 2006/0262926 A1 | 11/2006 | Candelore et al. |
| 2006/0269060 A1 | 11/2006 | Canoelore et al. |

FOREIGN PATENT DOCUMENTS

| | | |
|---|---|---|
| EP | 0527611 | 7/1992 |
| EP | 0558016 | 2/1993 |
| EP | 0596826 | 4/1993 |
| EP | 0610587 | 12/1993 |
| EP | 0680209 | 4/1995 |
| EP | 0674440 | 9/1995 |
| EP | 0674441 | 9/1995 |
| EP | 0833517 | 4/1998 |
| EP | 0866615 | 9/1998 |
| EP | 1 187 483 | 3/2002 |
| EP | 1187483 | 3/2002 |
| JP | 7067028 | 3/1995 |
| JP | 11243534 | 10/2002 |
| WO | WO 86/07224 | 12/1986 |
| WO | WO 94/10775 | 5/1994 |
| WO | WO 97/38530 | 10/1997 |
| WO | WO 00/31964 | 6/2000 |
| WO | WO 01/78386 | 10/2001 |

OTHER PUBLICATIONS

Preliminary Report on Patentability, PCT/US2004/005703, Oct. 12, 2005.

Liu, et al. Motion Vector Encryption in Multimedia Streaming, 2004, IEEE, pp. 64-71.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, ITO, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"A Report on Security Issues in Multimedia" by Gulwani, pp. 10-14, Apr. 30, 2000, Course Notes, Department of Computer Science and Engineering, Indian Institute of Technology Kanpur.

"Ad Agencies and Advertisers To Be Empowered with Targeted Ads Delivered by Television's Prevailing Video Servers" Article Business Section of The New York Times, Updated Thursday, Dec. 20, 2001.

Anonymous, Message Authentication With Partial Encryption, Research Disclosure RD 296086, Dec. 10, 1988.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Run-Time Performance Evaluation for a Secure MPEG System Supporting Both Selective Watermaking and Encryption" by Wu and Wu, Mar. 1, 1997, submitted to JSAC special issue on Copyright and Privacy Protection.

"Selective Encryption and Watermaking of MPEG Video (Extended Abstract)" by Wu and Wu, Feb. 17, 1997, submitted to International Conference on Image Science, Systems, and Technology, CISST'97.

"An Efficient MPEG Video Encryption Algorithm" by Shi and Bhargava, pp. 381-386, 1998 IEEE.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"DVD Demystified—The Guidebook for DVD-Video and DVD-ROM" by Jim Taylor, Pub. McGraw-Hill, 1998, ISBN: 0-07-064841-7, pp. 134-147.

"Multimedia and Security Workshop at ACM Multimedia" '98. Bristol, U.K., Sep. 1998.

Anonymous, New Digital Copy Protection Proposal Would Secure Authorized Copies, PR Newswire, Nov. 1998, pp. 1-3.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Pre-encryption Profiles Concept Overview and Proposal" Rev. 1.2, John b. Carlucci, Dec. 5, 2000.

"Fast Encryption Methods for Audiovisual Data Confidentiality" by Wu and Kuo, Nov. 2000, SPIE International Symposia on Information Technologies 2000, (Boston, Ma., USA).

"A Report on Security Issues in Multimedia" by Gulwani, Apr. 30, 2000, Course Notes, Department of Computer Science and Engineering, Indian Institute of Technology Kanpur.

"Visible World—A High Impact Approach to Customized Television Advertising" by Haberman, Dec. 2001.

Microsoft Windows XP, Oct. 2001, Microsoft, Screen Shots and Help Files.

MPEG-2 Digital Broadcast Pocket Guide vol. 6, Copyright 201 Acterna, LLC.

"Coral Consortium Aims to Make DRM Interoperable" by Bill Rosenblatt, Oct. 7, 2004, online at http://www.drmwatch.com/standards/article.php/3418741.

"Dynamic-Customized TV Advertising Creation and Production Tools" by SeaChange International, Web Site Literature ?,undated (trade show).

"Fast Encryption Methods for Audiovisual Data Confidentiality" by Wu and Kuo, Nov. 2000, SPIE International Symposia on Information Technologies 2000, (Boston, Ma., USA).

Metro Media™ PVR-DVD-MP3-Web—Internet publication from www.metrolink.com, undated.

"Passage™ , Freedom to Choose", 2003, Sony Electronics Inc.

"Pre-Encryption Profiles—Concept Overview and Proposal", Rev. 1.2 as submitted to the Open CAS consortium on Dec. 28, 2000.

"Selective Encryption and Watermarking of MPEG Video (Extended Abstract)" by Wu and Wu, Feb. 17, 1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

Anonymous, Message Authentication with Partial Encryption, Research discourse RD 296086, Dec. 10, 1998.

McCormac Hack Over Cablemodem, HackWatchAug. 10, 1998.

Aravind, H. , et al., "Image and Video Coding Standards", AT&T Technical Journal, (Jan./Feb. 1993),67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia,(Sep. 1993),20-22.

Kondo, et al., "Adaptive Dynamic Range Coding Scheme for Future Consumer Digital VTR", 219-226, Jan. 1, 1998.

Kondo, et al., "Adaptive Dynamic Range Coding Scheme for Future HDTV Digital VTR", Sony Corporation, (1991).

Lakshiminath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553, publication date of 1996.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993), 704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

* cited by examiner

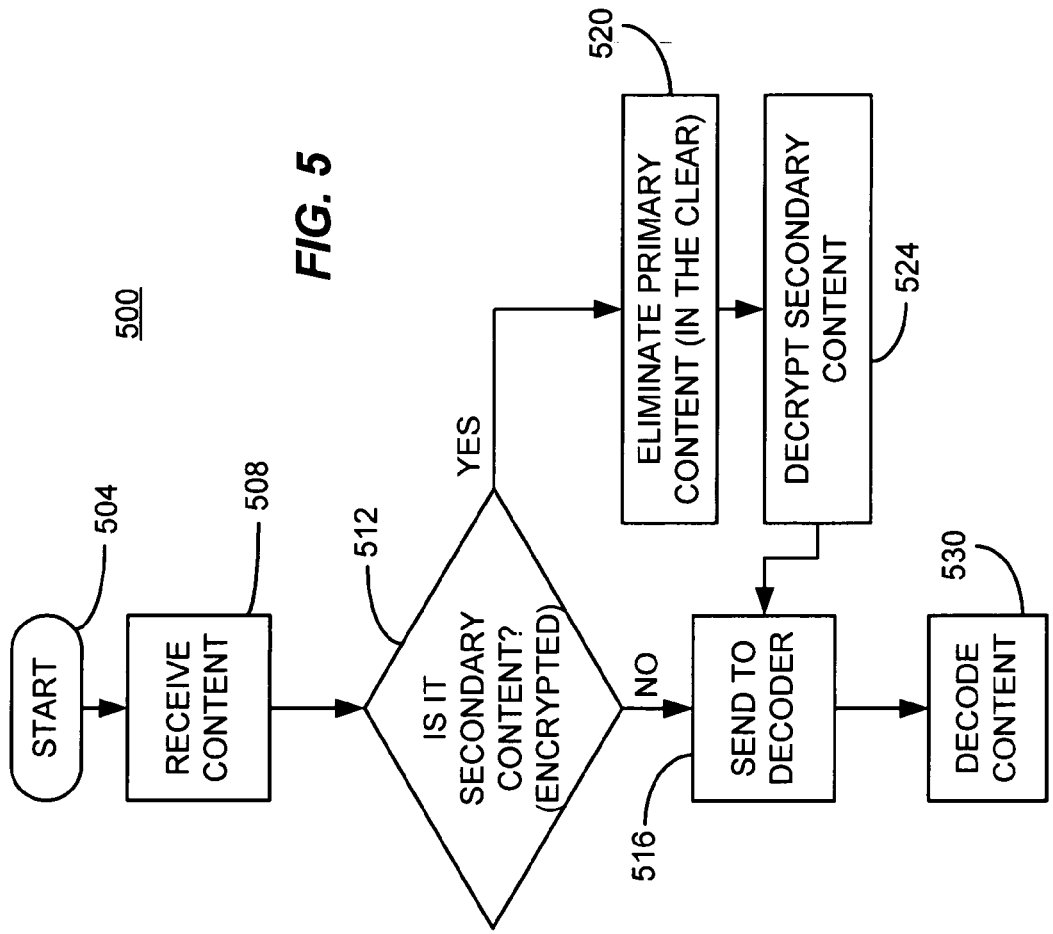

CONTENT SCRAMBLING WITH MINIMAL IMPACT ON LEGACY DEVICES

CROSS REFERENCE TO RELATED DOCUMENTS

This application claims priority benefit of U.S. Provisional Patent Application Ser. No. 60/457,192, filed Mar. 25, 2003, entitled "Content Scrambling with Minimal Impact on Legacy Devices", to Bonan, et al., which is hereby incorporated by reference. This application is also related to patent applications Ser. No. 10/038,217; Ser. No. 10/038,032; Ser. No. 10/037,914; Ser. No. 10/037,499; and Ser. No. 10/037,498. These patent applications were filed simultaneously on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Television is used to deliver entertainment and education to viewers. The source material (audio, video, etc.) is multiplexed into a combined signal which is then used to modulate a carrier. This carrier is commonly known as a channel. In terrestrial broadcasts, these channels correspond to government assigned frequencies and are distributed over the air. The program is delivered to a receiver that has a tuner that selects the signal from the air and delivers it to a demodulator, which in turn provides video to a display and audio to speakers.

Much of television content is valuable to its producers, therefore copyright holders want to control access, disallow re-transmission of content over the Internet, and restrict copies. Examples of such protected material include, but are not limited to, feature films and sporting events. Currently, television terrestrial broadcast systems do not generally use any sort of control measures such as encryption systems to prevent unauthorized copying of content.

DESCRIPTION OF THE DRAWINGS

The present invention, both as to organization and method of operation, together with objects and advantages thereof, may be best understood by reference to the following detailed description, which describes certain exemplary embodiments of the invention, taken in conjunction with the accompanying drawings in which:

FIG. 5 is a block diagram of Broadcast Flag usage consistent with certain embodiments of the present invention.

DETAILED DESCRIPTION

Figure 1:
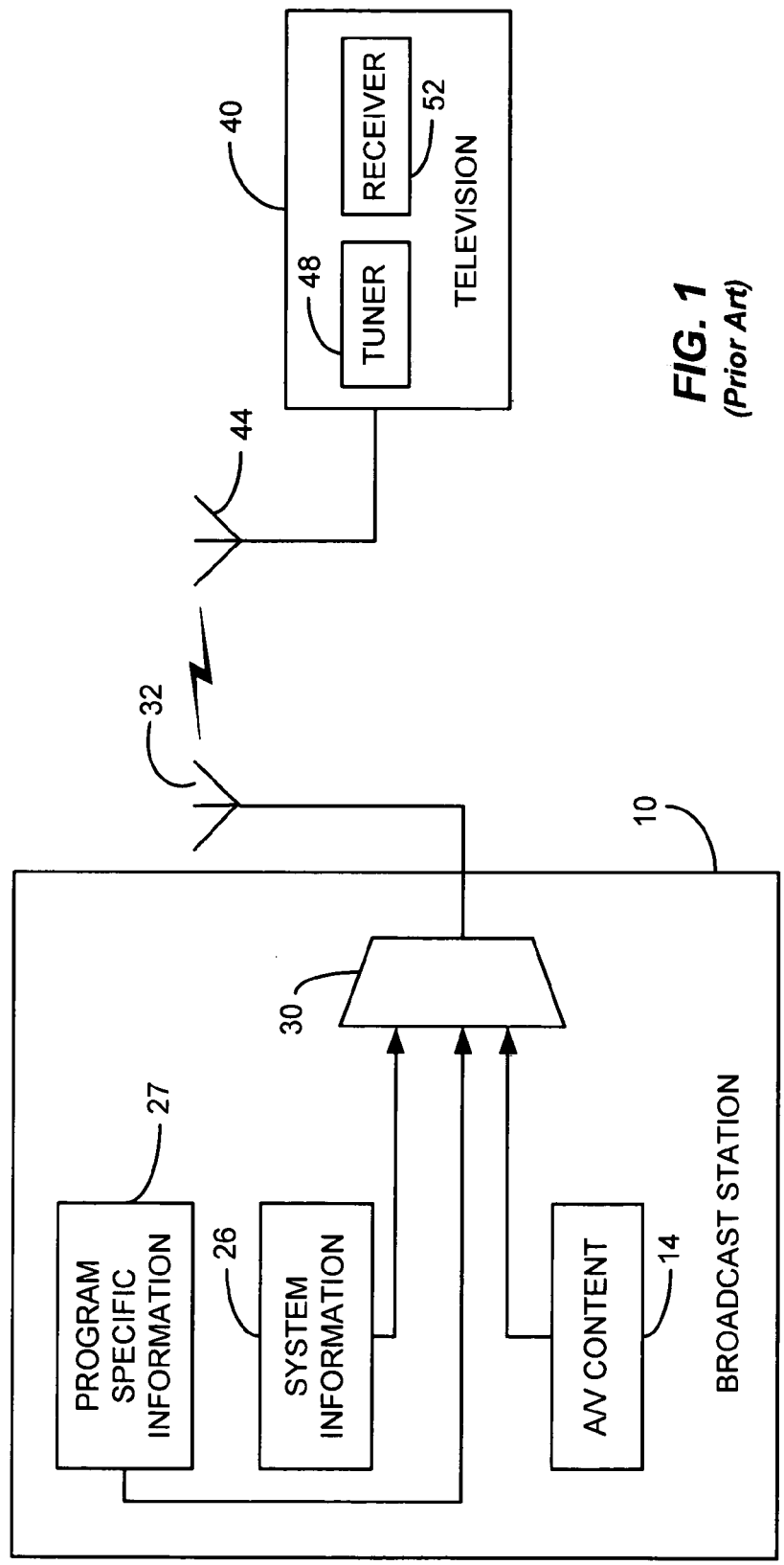
FIG. 1 is a block diagram of a conventional terrestrial broadcast system.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The following acronyms and abbreviations may be used herein:

ATSC—Advanced Television System Committee

A/V—Audio/Video

CA—Conditional Access

CPU—Central Processing Unit

DMA—Direct Memory Access

DTV—Digital Television

ECM—Entitlement Control Message

EPG—Electronic Program Guide

FCC—Federal Communications Commission

HDD—Hard Disk Drive

MPEG—Moving Pictures Experts Group

PAT—Program Allocation Table

PID—Packet Identifier

PMT—Program Map Table

PSI—Program Specific Information

PVR—Personal Video Recorder (a digital disk based video recorder)

RAM—Random Access Memory

SDRAM—Synchronous Dynamic Random Access Memory

STB—Set Top Box

TV—Television

Critical Packet—A packet or group of packets that, when encrypted, renders a portion of a video image difficult or impossible to view if not properly decrypted, or which renders a portion of audio difficult or impossible to hear if not properly decrypted. The term "critical" should not be interpreted as an absolute term, in that it may be possible to hack an elementary stream to overcome encryption of a "critical packet", but when subjected to normal decoding, the inability to fully or properly decode such a "critical packet" would inhibit normal viewing or listening of the program content. The MPEG transport specification specifies 188 bytes per packet. At the program stream level, packets may be variable in size, e.g., typically on the order of 2000 bytes.

Selective Encryption (or Partial Encryption)—encryption of only a portion of an elementary stream in order to render the stream difficult or impossible to use (i.e., view or hear).

Dual Selective Encryption—encryption of portions of a single selection of content under two separate encryption systems.

The terms "a" or "an", as used herein, are defined as one, or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The terms "scramble" and "encrypt" and variations thereof may be used synonymously herein. Also, the term "television program" and similar terms can be interpreted in the normal conversational sense, as well as a meaning wherein the term means any segment of A/V content that can be displayed on a television set or similar monitor device. The term "video" is often used herein to embrace not only true visual information, but also in the conversational sense (e.g., "video tape recorder") to embrace not only video signals but associated audio and data. The term "legacy" as used herein refers to existing technology used for existing terrestrial broadcast systems. The exemplary embodiments disclosed herein can be decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself.

A conventional broadcast system arrangement is depicted in FIG. 1. At the broadcast station 10 in such a system, the broadcaster processes audio/video (A/V) content 14 in the clear. The A/V content along with system information (SI) 26 and program specific information (PSI) 27 is multiplexed together at multiplexer (MUX) 30, modulated and transmitted over the air via antenna 32 to a user's TV 36. TV 36 demodulates the signal and supplies it to a television set 44 for viewing by the user.

In a terrestrial system such as that of FIG. 1, digital program streams are broken into packets for transmission. Packets for each component of a program (video, audio, auxiliary data, etc.) are tagged with a packet identifier or PID. These packet streams for each component of all programs carried within a channel are aggregated into one composite stream. Additional packets are also included to provide other overhead information.

Overhead information usually includes guide data describing what programs are available and how to locate the associated channels and components. This guide data is also known as system information or SI. In terrestrial broadcasts, SI is delivered to the television receiver or set-top box (STB) in-band (part of the data encoded within a channel).

The broadcast is received at a television (or STB) 40 via antenna 44 which passes the received signal to tuner 48 which translates the incoming signal to baseband or intermediate frequency. The receiver 52 then decodes the programming for display on the television display.

As of spring 2003, approximately 4.7 million High Definition (HD)-ready digital TVs (DTVs) have been produced and sold to consumers since the fall of 1998 in the U.S. About 11 percent, or 543,000, were sold with integrated DTV tuners. These sets, such as TV 40, cannot descramble content, should the terrestrial broadcasters choose to protect their content through scrambling, and might be rendered obsolete or in need of modification or in need of use of an adapter.

Enforcement of conditional access to protected content often involves scrambling that content in a cryptographically secure manner. Authorized devices have the hardware support for descrambling, and are given the decryption keys. Unauthorized devices may have the hardware, but will not generally have access to the keys necessary for descrambling.

Conditional access (CA) technology often involves use of intellectual property protected by patent or trade secret, therefore authorized devices are subject to the terms of a technology license. Terms of such licenses often involve provisions requiring protection of digital outputs appropriate to the "copy control information" (CCI) applicable to a given piece of content. The license may also require cryptographic keys and algorithms to be protected, to some degree, against physical attack. These provisions are called "robustness rules." If scrambling were to be used for terrestrial broadcast, then new TVs or other television receiver devices could be built to support the chosen method of conditional access (using conditional access modules or embedded keys necessary for descrambling). Access to the keys whether through conditional access or embedded keys could be subject to licensing terms. Part of the licensing terms could allow the broadcaster to enforce content handling rules. The moment terrestrial broadcast scrambling were switched on, however, legacy DTVs would be immediately impacted. They would be unable to access any scrambled services since they would lack the necessary descrambling circuitry and access to the keys.

The only known current option to avoiding letting the existing DTVs go dark is "full dual carriage". Full dual carriage means that transmission is duplicated for each program—it is sent in the clear and also sent encrypted. To provide full dual carriage, the broadcast stream is enhanced to provide encryption. Legacy TVs would not be impacted and would continue to perform their function despite any change. However, full dual carriage often comes at an unpalatable price because of the bandwidth impact, thus reducing the number of unique programs that a broadcaster may offer. In a simple case, "full dual carriage" would require the same bandwidth for both the "in the clear" and encrypted program streams. If the original unencrypted stream is using up all, or most, of the available bandwidth (as would be the case with a High Definition broadcast), "full dual carriage" is clearly not an option. Thus, "full dual carriage" suggests that both program streams be carried at a substantially lower quality level, in order to fit in the available bandwidth. In simple terms, this would mean carrying the program stream at a lower quality level than in the pre-encrypted case. Generally, the number of premium channels suffers so that the number of options available to the viewer, and/or the quality of the program, is limited and the value that can be provided by the broadcasters is diminished.

The broadcaster may chose to leave the main channel in-the-clear so that it may be descrambled by both old and new TVs. Secondary channels may be fully encrypted and only available to new TVs. However, using secondary channels takes away from the overall bandwidth that may be used for the primary channel, as described above. Ideally, some method is needed to make old and new TVs work on the primary channel without wasting bandwidth, while at the same time allowing the broadcasters to protect their content.

Broadcasters wish to prevent unauthorized re-distribution of their content over the Internet. As of this writing, the ATSC standards organization has proposed the use of a "broadcast flag" with the standard A/65A, which would indicate that copyright is asserted for certain broadcast programming and that Internet distribution of broadcast programming labeled with this flag is disallowed. Proposed regulations related to the Broadcast Flag would require a mechanism to block unauthorized distribution beyond the personal digital network environment. The Broadcast Flag is a descriptor sent in the program specific information (PSI). It is anticipated by proponents of the Broadcast Flag, that legislation or FCC regulations would require television tuners and similar devices to comply with certain specification to prohibit unauthorized redistribution. However, the Broadcast Flag does not itself protect or encrypt content. Those functions are performed by the FCC regulations. As a result, the transmission remains in the clear, and subject to reception and unauthorized redistribution outside the United States, where FCC regulations do not apply or by those willing to defy such regulations in the United States.

A solution that allows the use of encryption would mitigate this problem, since tuners, even outside the scope of FCC regulation, would need to license decryption technology, which would include restrictions limiting unauthorized redistribution. To date, encryption solutions have not been widely believed to be acceptable solutions for three principal reasons: 1) the perceived bandwidth problems described above, 2) the inherent incompatibility with the installed base of DTV receivers, and 3) cessation of sales of current and near-term future DTV receivers that do not incorporate decryption.

The present invention provides a solution for these issues. By enabling the simultaneous transmission of both in-the-clear, and encrypted signals, without significant additional bandwidth requirements, the invention enables a smooth transition from in-the-clear transmission to encrypted transmission (and its associated technology license) with minimal impact on existing equipment and services.

By allowing simultaneous transmission of in-the-clear and encrypted signals, encryption can be required of broadcasters and receiving equipment, by regulatory authorities (or legislation) on a date certain, without requiring cessation of in the clear transmissions on the same date. Cessation of in the clear transmissions can be set for a date far enough in the future to allow simple obsolescence to minimize the number of legacy receivers that are affected.

Modern digital satellite and broadcast networks often use CA systems that fully encrypt digital audio and video to make programming inaccessible except to those who have properly subscribed. Such encryption is designed to thwart hackers and non-subscribers from receiving programming that has not been paid for, and to provide content handling rules for content after it has been descrambled.

However, terrestrial broadcasts are not currently scrambling their streams. As terrestrial broadcasters wish to protect their content, they are frustrated by the need to support the legacy TVs that are unable to handle scrambled content. Transmitting multiple copies of a single program in the clear and encrypted uses too much bandwidth to be a practical solution, as described earlier.

An embodiment of the present invention addresses this problem by minimizing the bandwidth requirements to provide an equivalent result to multiple carriage without the full bandwidth penalty. The result could be described as "virtual dual carriage" since the benefits of full dual carriage are provided without the full bandwidth cost. A selection criterion is used to select packets for encryption under such a scheme. The criteria used to select packets affect the additional bandwidth requirements and the effectiveness of the encryption.

Certain of the implementations of selective dual carriage described herein utilize an additional (secondary) PID for each duplicated component. These secondary PIDs are used to tag packets that carry duplicated content with the encryption method. The PSI is enhanced to convey information about the existence of these new PIDs in such a way that inserted PIDs are ignored by legacy TVs but can be easily extracted by new TVs.

The new PID is used to tag packets encrypted by the encryption method. Packets with the secondary PID shadow the packets tagged with the primary PID. The packets making up the pairs can occur in either order but, in the preferred implementation, maintain sequence with the clear portion of the PID stream. By use of the primary and secondary PIDs, the decoder located in the set-top box or television set can readily determine which packets are to be decrypted using the decryption method associated with that TV, as will be clear upon consideration of the following description. The processes used to manipulate PIDs will be described later in greater detail.

In general, the encryption technique disclosed herein seeks to encrypt portions of an audio or video signal while leaving other portions of the audio or video signal in the clear to conserve bandwidth. Bandwidth can be conserved because the same clear portion can be sent to all varieties of TVs or other devices. Various methods are used to select the portions of information to be encrypted, for example as described in the above-referenced patent applications. By so doing, the various embodiments of this invention eliminate the traditional "brute-force" technique of encrypting the entire content in one specific scrambling scheme, which predicates the redundant use of bandwidth if alternate scrambling schemes are desired.

The various embodiments of the invention use several processes, alone or in combination, to send substantial portions of content in the clear while encrypting only a small amount of information required to correctly reproduce the content. Therefore the amount of information transmitted that is encrypted is a small percentage of the content, as opposed to the entire replication of each desired program stream. For purposes of the exemplary systems in this document, the encryption technique described above will now be described in detail.

Substantial efficiency in bandwidth utilization can be achieved by use of a selective packet-by-packet dual carriage. In this technique, packets are selected for duplication and encryption based upon their importance to the proper decompression or enjoyment of the audio and/or video of the program content.

This embodiment can reduce the bandwidth requirement compared with full dual carriage of encrypted content by only scrambling a small fraction of the packets. The original A/V content is left in the clear. Non-legacy TVs share the clear non-duplicated packets, and replace the clear packet with the duplicated packet (marked with a different PID). Non-legacy TVs descramble the encrypted packet. As little as one percent of the total content bandwidth can be duplicated and encrypted. A broadcast station can send the clear content to be received by legacy TVs as before, and a small number of encrypted packets for new TVs.

To decrypt the encrypted packets, the TVs may use a conditional access system such as those used by Motorola, Scientific Atlanta, NDS and others, or may contain some global agreed upon keys.

Figure 2:
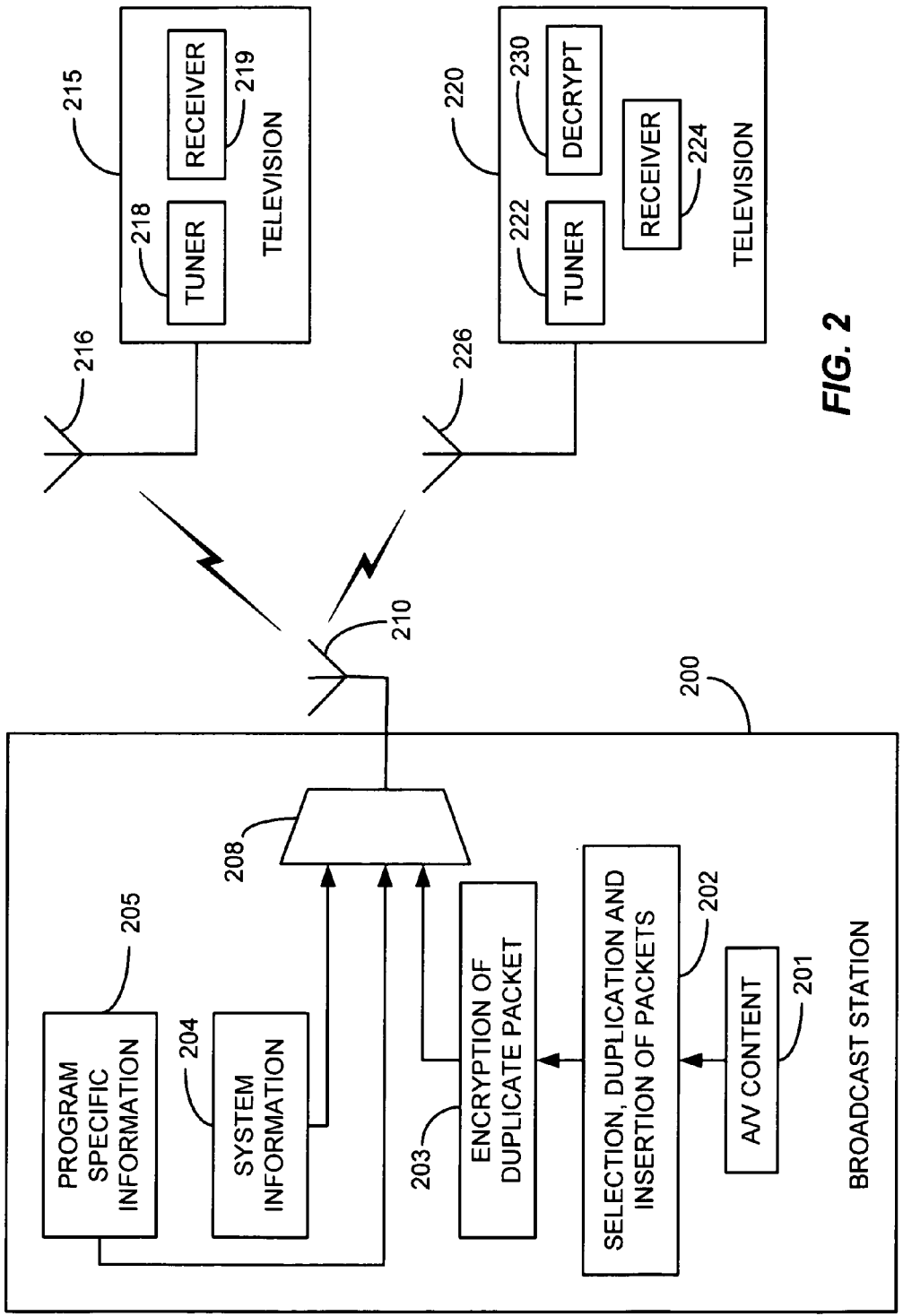
FIG. 2 is a flow chart of a dual delivery and encryption process consistent with certain embodiments of the present invention.

Referring now to FIG. 2, a block diagram of a system consistent with an exemplary embodiment of the present invention in which portions of programming are dual carried on a packet-by-packet basis. In this system, packets of each program are dual carried using, for example, global agreed upon keys. The packets that are dual carried are selected based upon their importance to the proper decompression or enjoyment of the video and/or audio stream.

In the system illustrated in FIG. 2, the broadcast station 200 selects, duplicates and inserts selected A/V content 201 packets at a processor 202 and encrypts the content at encrypter 203. Packets selected for encryption are chosen so that their non-receipt (by a non-paying decoder) would severely affect the real-time decoding or enjoyment of a program. That is, only critical packets (as defined above) are encrypted. For the video and audio, this can be accomplished, for example, by encrypting "start of frame" transport stream packets containing PES (packetized elementary stream) headers and other headers as part of the payload, since without this information, the STB decoder cannot decompress the MPEG compressed data. MPEG2 streams identify "start of frame" packets with the "Packet Unit Start Indicator" in the transport header. Generally, packets carrying a payload that contains a group of pictures header or a video sequence header can be used to effect the present scrambling technique.

MPEG (Moving Pictures Expert Group) compliant compressed video repackages the elementary data stream into the transport stream in somewhat arbitrary payloads of 188 bytes of data. As such, the transport stream packets containing a PES header can be selected in this example for dual carriage at selector 202 and encrypted by the global keys at the encrypter 203. Packets to be dual carried are duplicated and the PIDs of duplicate packets encrypted by encrypter 202 are remapped at 201 to a secondary PID. The remaining packets are passed in the clear. The clear packets and duplicated and encrypted packets and system information 204 and program specific information 205 are multiplexed together at 208 for broadcast over the broadcast system via antenna 210.

As with the previous system, the legacy TV 215 receives clear packets at antenna 216 and sends them to the tuner 218 and receiver 219 as before. In the new decryption enabled TV 220, the program is received at tuner 222 and receiver 224 via antenna 226 and assigned both a primary and a secondary PID for a single program. The non-duplicated clear packets with the primary PID are received and passed to the decoder. The clear packets (that have been duplicated) are discarded. Encrypted packets with the secondary PID are decrypted at 230 and then recombined with the data stream (e.g., by remapping the packets to the primary PID) for decoding.

Using video as an example, each sample is known as a frame and the sample rate is typically 30 frames per second. If the samples are encoded to fit into 3.8 Mbps, each frame would occupy 127K bits of bandwidth. This data is sliced for MPEG transport into packets of 188 bytes with the first packet(s) of each frame containing the header used for instructions to process the body of the frame data. Dual carriage of just the first header packet (1504 additional bits) requires only 1.2% (1504/127K) of additional bandwidth. For high definition (19 Mbps) streams the percentage is even less.

As previously stated, transport stream packets containing a PES header are one preferred target for encryption according to the present embodiment, but other packets could also be selected according to a selection criterion such as those described in the above referenced patent application and others which are pending. These packets contain sequence headers, sequence extension headers, picture headers, quantization and other decode tables that also fall within the same packet. If these packets cannot be decoded by new TVs, not even small portions of the program can be viewed. In general, any attempt by new TVs to tune to the program will likely be met with a blank screen and/or no audio whatsoever since known decoder integrated circuits use the PES header to sync up to an elementary stream such as video and audio in real-time. By encrypting the PES header, the decoding engine in an unauthorized set-top box or TV cannot even get started. Those skilled in the art will appreciate that for implementation of this embodiment of the invention, other critical or important packets or content elements may also be identified for encryption that could severely inhibit unauthorized viewing without departing from the present invention. For example, MPEG intra-coded or I frame picture packets could be encrypted to inhibit viewing of the video portion of the program.

Figure 3:
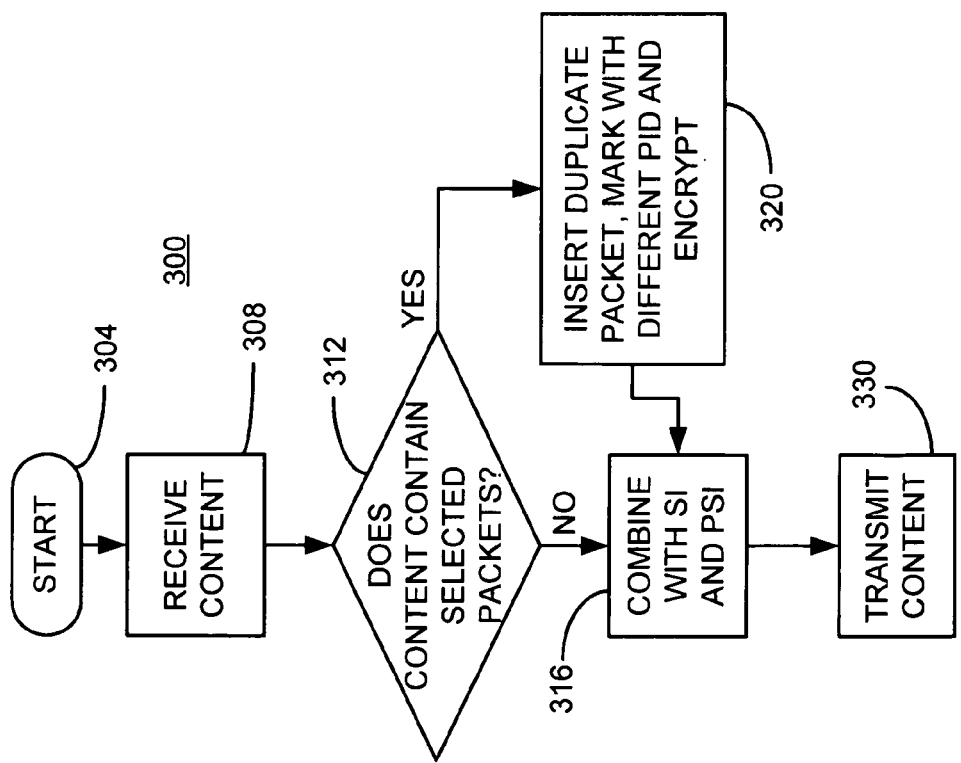
FIG. 3 is a flow chart of a dual delivery and encryption process consistent with certain embodiments of the present invention.

FIG. 3 is a flow chart depicting an exemplary encoding process such as that which would be used at Broadcast station 200 of FIG. 2 starting at 304. Content is received at 308. When a transport stream packet is received at block 202, the packet is examined to determine if it meets a selection criterion for encryption at 312. If not, the packet is passed as a clear unencrypted packet (C) for insertion into the output data stream at 316. If the packet meets the criteria, control passes to 320 and it is duplicated at block 202 to produce a duplicated packet. This encrypted packet is mapped to a secondary PID at block 202. The duplicated packets EA is inserted into the output data stream along with clear packets C at block 202. The duplicated packets are encrypted under global keys at 203 to produce an encrypted packet. Preferably, the duplicated packets are inserted at the location in the data stream where the single original packet was obtained for encryption so that the sequencing of the data remains essentially the same. At 316, the data packets are combined with SI and PSI data and the stream is transmitted at 330.

Thus, a terrestrial broadcast digital television signal consistent with certain embodiments has a collection of modulated packets, with the collection of modulated packets including clear unencrypted packets of content, and duplicates of selected ones of the clear unencrypted packets that are encrypted under an encryption system.

The selective encryption arrangement described above can greatly reduce the bandwidth requirements over that required for full dual carriage. Encrypting the PES header information can be effective in securing video and audio content, while allowing content to also be received in the clear by legacy TVs in the same broadcast system. Legacy TVs are un-affected, and new TVs require only an minor hardware, firmware, or software enhancement to listen for two PIDs each for video and audio. Broadcast station modification is limited to selecting content for dual carriage, encrypting the duplicated packet, and providing a means to mix the duplicated packet into a composite output stream.

The PID mapping concepts described above can be generally applied to the selective dual carriage techniques described herein, where needed. At the broadcast station, the data stream of packets is manipulated to duplicate packets selected for dual carriage. Those packets are sent in two distinct encryption manners—clear and encrypted. The duplicated packets are assigned separate PIDs (one of which matches the reset of the clear content) and reinserted in the location of the original selected packet in the data stream for transmission over the broadcast system. At the output of the broadcast system, a stream of packets appears with global key encrypted packets, and clear packets having a different PID. A secondary PID identifies the packets that are encrypted under the encryption system. In addition to the PID remapping that takes place at the station, MPEG packets utilize a continuity counter to maintain the appropriate sequence of the packets. In order to assure proper decoding, this continuity counter should be properly maintained during creation of the packetized data stream at the station. This is accomplished by assuring that packets with each PID are assigned continuity counters sequentially in a normal manner. Thus, packets with the secondary PID will carry a separate continuity counter from those of the primary PID. This is illustrated below in simplified form where PID 025 is the primary PID and PID 125 is the secondary PID, E represents an encrypted packet, C represents a clear packet, and the end number represents a continuity counter.

| 025C04 | 025C05 | 125E11 | 025C06 | 025C07 | 025C08 | 025C09 | 125E12 |

In this exemplary segment of packets, packets with PID 025 are seen to have their own sequence of continuity counters (04, 05, 06, 07, 08, 09, . . . ). Similarly, the packets with secondary PID 125 also have their own sequence of continuity counters (11, 12, . . . ).

At the STB, the PIDs can be manipulated in any number of ways to correctly associate the encrypted packets with secondary PID with the correct program. In one implementation, the packet headers of an input stream segment illustrated below:

| 025C04 | 025C05 | 125E11 | 025C06 | 025C07 | 025C08 | 025C09 | 025E10 | are manipulated to create the following output stream segment:

| 125C04 | 025E11 | 125C05 | 125C06 | 125C07 | 125C08 | 125C09 | 125E10 |

The primary PIDs (025) in the input stream are replaced with the secondary PID (125) for the clear packets (C). For the encrypted packets, the primary PID and secondary PID are retained, but the continuity counters are swapped. Thus, the stream of packets can now be properly decrypted and decoded without errors caused by loss of continuity using the secondary PID. Other methods for manipulation of the PIDs, e.g. mapping the PID (125) on the duplicated clear packet to a NOP PID (all ones) or other PID value not decoded, and the continuity counters can also be used in embodiments consistent with the present invention.

The primary and secondary PIDs are conveyed to the STBs in the program map table (PMT) transmitted as a part of the program system information (PSI) data stream. The existence of a secondary PID can be established to be ignored by the TV operating without descrambling capability. But new TVs operating with knowledge of the global ATSC keys are programmed to recognize that secondary PIDs are used to replace the clear part of the program associated with the primary PID. The set-top boxes are alerted to the fact that this encryption scheme is being used by the presence of a ATSC CA descriptor in the elementary PID "for loop" of the PMT. There typically would be a CA descriptor for the video elementary PID "for loop", and another one in the audio elementary PID "for loop". The CA descriptor uses a Private Data Byte to identify the CA_PID as either the ECM PID or the secondary PID used for selective scrambling, thus setting up the STB operating under system B to look for both primary and secondary PIDs associated with a single program. Since the PID field in the transport header is thirteen bits in length, there are $2^{13}$ or 8,192 PIDs available for use, any spare PIDs can be utilized for the secondary PIDs as required.

While conceptually the PID mapping at the broadcast station is a simple operation, in practice the broadcast station equipment is often already established and is therefore modified to accomplish this task in a manner that is minimally disruptive to the established broadcast system while being cost effective. Thus, the details of the actual implementation within the broadcast system are somewhat dependent upon the actual legacy hardware present in the station, examples of which are described in greater detail below.

Several TV implementations are possible within the scope of the present invention. The method used at the headend to select packets for encryption is irrelevant to the STB.

Figure 4:
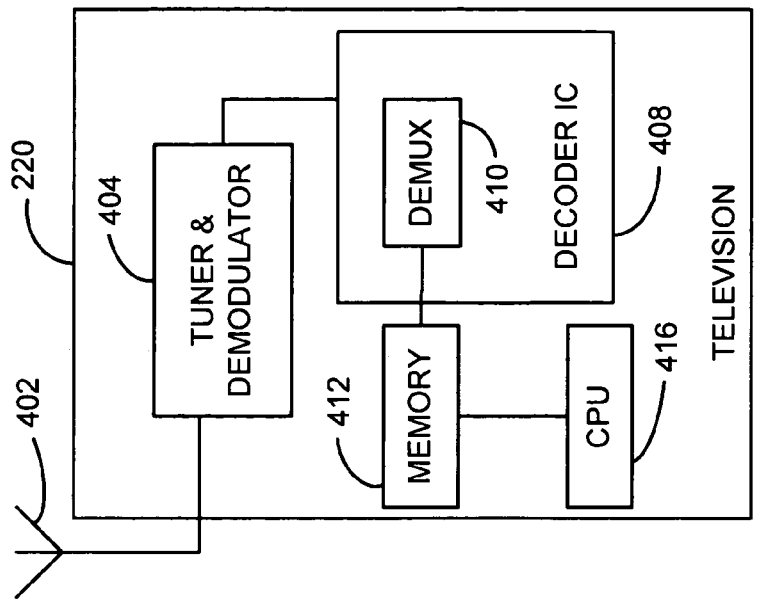
FIG. 4 is a block diagram of a TV consistent with certain embodiments of the present invention.

One such implementation is illustrated in FIG. 4. In this embodiment, packets are received by an antenna and passed to a tuner and demodulator 404. Packets are then provided to a decoder circuit 408's demultiplexer 410. The packets are buffered into a memory 412 (e.g., using a unified memory architecture) and processed by the STB's main CPU 416 (or other CPU or hardware) using software or firmware stored in memory 412.

Selected PIDs can be stripped from the incoming transport via the STB's PID filter, decrypted and buffered in SDRAM, similar to the initial processing required in preparation for transfer to an HDD in a PVR application. The host CPU 916 can then "manually" filter the buffered data in SDRAM for elimination of the packets containing unneeded PIDs. There are some obvious side effects to this process.

An exemplary process 500 for carrying out the decoding of received content is illustrated in FIG. 5 starting at 504. Content is received at 508 and passed to 512 where a determination is made as to whether the content is secondary (i.e., encrypted and identified by a secondary PID). If not, the content is sent directly to the decoder at 516. If so, the duplicate packets carrying the primary (unencrypted) content is dropped at 520 and the secondary content is decrypted at 524. Content is then passed to the decoder at 516, and the content is decoded at 530.

The host overhead is estimated to be about 1% of the bandwidth of the CPU. In the worst case, this is equivalent to 40K bytes/Second for a 15 Mbit/S video stream. This reduction is possible since at most only 4 bytes of each packet is evaluated and the location is on 188 byte intervals so the intervening data does not have to be considered. Each packet header in SDRAM can therefore be directly accessed through simple memory pointer manipulation. Additionally, Packets are cached in blocks and evaluated en masse to reduce task switching of the host. This would eliminate an interrupt to other tasks upon the reception of each new packet. This may produce a increased latency for starting decode of a stream upon channel change to allow time for cache fill. This may be negligible depending upon the allocated SDRAM cache buffer size.

The host filtered packets in the SDRAM buffer are then transferred to the A/V Queue through existing hardware DMA processes and mimics a PVR implementation. The filtered packets are then provided to the decoder 922 for decoding.

The present embodiments have been described in terms of a digital A/V system using MPEG 2 coding. Thus, the various packet names and protocol specifically discussed is related the MPEG 2 coding and decoding. However, those skilled in the art will appreciate that the concepts disclosed and claimed herein are not to be construed in such a limited scope. The same or analogous techniques can be used in any digital broadcast system without limitation to MPEG 2 protocols.

Also, while the present invention has been described in terms of the use of the encryption and copy protection techniques described to provide a mechanism for dual carriage of a television program, those skilled in the art will appreciate that the concepts disclosed and claimed herein are not to be construed in such a limited scope. The same or analogous techniques can be used in any digital transmission system without limitation to television protocols.

Additionally, although specifically disclosed for the purpose of encrypting and copy protecting television programming, the present inventions can be utilized for dual carriage of other content including, but not limited to content for download over the Internet or other network, music content, packaged media content as well as other types of information content. Such content may be played on any number of playback devices including but not limited to personal digital assistants (PDAs), personal computers, personal music players, audio systems, audio/video systems, etc. without departing from the present invention that do not have descrambling capability.

Numerous embodiments are possible without departing from the present invention. For example, a method of encrypting a digital television signal, consistent with certain embodiments of the invention may involve examining unencrypted packets of data in the digital television signal to identify a selected packet type; duplicating packets identified as being of the selected packet type; encrypting the duplicated packets; and adding the duplicated and encrypted packets along with the unencrypted packets of the selected packet type in the digital television signal to produce a selectively encrypted digital television signal. The method can further involve distributing an ATSC broadcast flag with the selectively encrypted digital television signal. The content can represent one or more channels in a transport stream, regardless of whether other channels are encrypted or unencrypted. In addition, the key used to encrypt the content can be a function of the copy control information of the content, or the key used to encrypt the content can be a function of global ATSC defined keys. The selected packet type may be, for example, a packet carrying information that is needed to decompress the digital television signal. The method can further involve assigning a packet identifier to the unencrypted packets. The method can further involve assigning the packet identifier to the encrypted packets. The packet identifier can be a primary packet identifier; and a secondary packet identifier can be assigned to the encrypted packets.

In another exemplary embodiment, a method of encrypting a digital television signal involves examining unencrypted packets of data in the digital television signal to identify a selected packet type; identifying packets as being of the selected packet type to produce first packets; duplicating and encrypting the packets identified as being of the selected packet type using an encryption method to produce second packets; and replacing the unencrypted packets of the selected packet type with the first packets and the second packets in the digital television signal to produce a selectively dual encrypted television signal. The method can further involve assigning a packet identifier to the unencrypted packets. The method can further involve assigning the packet identifier to the encrypted packets.

A television receiver, consistent with certain embodiments of the present invention has a receiver receiving a digital television signal. The signal has a plurality of unencrypted packets; and a plurality of encrypted packets, wherein the encrypted packets duplicate some of the unencrypted packets and contain information required to decode the digital television signal. A decrypter decrypts the encrypted packets and drops the transmitted unencrypted version of the same packets. A decoder decodes the unencrypted packets and the decrypted packets to produce a signal suitable for play on a television set. In certain embodiments, the digital television signal complies with an MPEG standard, and the unencrypted packets are identified by a primary packet identifier, and the encrypted packets are identified by a secondary packet identifier. In certain embodiments, the digital television signal is compressed, and the encrypted packets comprises a packet type that is needed to decompress the digital television signal if the duplicated packets sent in the clear are ignored.

In other embodiments consistent with the invention, a method of decoding a selectively encrypted television program, involves receiving a digital television program comprising a plurality of packets, wherein certain packets of the plurality of packets are encrypted and a remainder of the packets are unencrypted, wherein the encrypted packets are also sent unencrypted and contain information that is required for correct decoding of the television program; decrypting the encrypted packets to produce decrypted packets; and decoding the decrypted packets and the unencrypted packets to produce a decoded television signal. In certain embodiments, the selectively encrypted television program is a digital television program, and the certain encrypted packets comprise packets that are needed to decode the television program if the duplicated packets sent in the clear are ignored. In certain embodiments, the selectively encrypted television program complies with a digital satellite service or digital cable transport standard, and wherein the encrypted packets carry a payload of a packetized elementary stream header.

In other embodiments, a method of decoding selectively encrypted content involves receiving selectively encrypted content comprising unencrypted content, content sent in the clear and encrypted under an encryption system, the encrypted content comprising information needed for correct decoding of the selectively encrypted content if the duplicated content in the clear is ignored; and decrypting the encrypted content under the encryption system to produce decrypted content. In certain embodiments, the method further involves decoding the unencrypted content, ignoring the duplicated unencrypted content, and the decoding decrypted content to decode the selectively encrypted content. In other embodiments, the digital television signal complies with a digital satellite service or digital cable transport standard, and wherein the encrypted packets carry a payload of a packetized elementary stream header.

It should be understood that terrestrial broadcasts signals not only emanate over-the-air, but also be part of satellite "local-into-local" and cable "must carry" content offerings. For those delivery options, the streams as encoded by certain embodiments consistent with the present invention can be passed through to the satellite or cable set-top box for processing in a similar fashion as the new TV. Another possibility, is that copy protection information can be "transcoded" into the satellite or cable format with the result that the content is 100% encrypted using the conditional access provider of the satellite or cable system. The set-top boxes in those systems could obey the copy protection rules that would be "transcoded' from the original terrestrial broadcast signal.

Those skilled in the art will recognize that the present invention has been described in terms of exemplary embodiments that can be realized by use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Thus, an encryption arrangement for television programs or other digital programming consistent with certain embodiments sends content completely in-the-clear and also encrypts only a portion of the content required for full presentation of a television program. The arrangement allows interoperability between new TVs that can handle encryption and older TVs that cannot. Regulations prevent new TVs from receiving only the clear content. New TVs are made to descramble the encrypted portions of the content. Older legacy TVs can receive all the content in the clear. The encrypted portions are chosen so that dramatically less bandwidth is required as compared to full dual carriage of the content. Licensing provisions relating to the encryption technology can be used to control unauthorized use of content.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, can be implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A method of encrypting a digital television signal, comprising:
examining unencrypted packets of data in the digital television signal to identify a selected packet type;
duplicating packets identified as being of a selected packet type to produce pairs of duplicated packets;
encrypting one of each pair of the duplicated packets;
inserting the encrypted packets along with the unencrypted packets of the selected packet type into the digital television signal along with the unencrypted packets of data that are not of the selected packet type to produce a selectively encrypted digital television signal that contains duplicate packets of the selected packet type with one of the duplicate packets being encrypted while the other of the duplicated packets remains unencrypted; and
broadcasting the selectively encrypted television signal over a terrestrial broadcast transmission system.

2. The method according to claim 1, further comprising distributing an ATSC broadcast flag with the selectively encrypted digital television signal.

3. The method according to claim 1, wherein the selectively encrypted television signal represents one or more channels in a transport stream.

4. The method according to claim 1, wherein a key is used to encrypt the duplicate packets, and wherein the key is a function of copy control information associated with the digital television signal.

5. The method according to claim 1, wherein a key is used to encrypt the duplicate packets, and wherein the key is a function of global ATSC defined keys.

6. The method according to claim 1, wherein the selected packet type comprises packets carrying information that is needed to decompress the digital television signal.

7. The method according to claim 1, further comprising assigning a packet identifier to the unencrypted packets.

8. The method according to claim 1, further comprising assigning the packet identifier to the encrypted packets.

9. The method according to claim 1, wherein the packet identifier is a primary packet identifier; and a secondary packet identifier is assigned to the encrypted packets.

10. A method of encrypting a digital television signal, comprising:
examining unencrypted packets of data in the digital television signal to identify a selected packet type;
identifying packets as being of the selected packet type to produce first packets;
duplicating and encrypting duplicates of the packets identified as being of the selected packet type using an encryption method to produce second packets while retaining the first packets in an unencrypted state;
replacing the unencrypted packets of the selected packet type with the first packets and the second packets in the digital television signal to produce a selectively dual encrypted television signal that contains duplicate packets of the selected packet type with one of the duplicate packets being encrypted while the other of the duplicated packets remains unencrypted; and broadcasting the selectively encrypted television signal over a terrestrial broadcast transmission system.

11. The method according to claim 10, further comprising assigning a packet identifier to the unencrypted packets.

12. The method according to claim 10, further comprising assigning the packet identifier to the encrypted packet.

13. The method according to claim 10, wherein the digital television signal is compressed, and wherein the encrypted packets comprises a packet type that is needed to decompress the digital television signal if the duplicated packets sent in the clear are ignored.

14. A television receiver, comprising:
   a receiver receiving a terrestrial broadcast digital television signal, wherein the television signal has a plurality of unencrypted packets and a plurality of encrypted packets, wherein the encrypted packets duplicate some of the unencrypted packets and contain information required to decode the digital television signal;
   a decrypter that decrypts the encrypted packets and drops the transmitted unencrypted version of the same packets; and
   a decoder that decodes the unencrypted packets and the decrypted packets to produce a signal suitable for play on a television set.

15. The television receiver according to claim 14, wherein the digital television signal complies with an MPEG standard, and wherein the unencrypted packets are identified by a primary packet identifier, and the encrypted packets are identified by a secondary packet identifier.

16. The television receiver according to claim 14, wherein the digital television signal is compressed, and wherein the encrypted packets comprises a packet type that is needed to decompress the digital television signal if the duplicated packets sent in the clear are ignored.

17. A method of decoding a selectively encrypted terrestrial broadcast television program, comprising:
   receiving a selectively encrypted terrestrial broadcast digital television program comprising a plurality of packets, wherein certain packets of the plurality of packets are encrypted and a remainder of the packets are unencrypted, wherein the encrypted packets are also sent unencrypted and contain information that is required for correct decoding of the television program; and
   decrypting the encrypted packets to produce decrypted packets; and decoding the decrypted packets and the unencrypted packets to produce a decoded television signal.

18. The method according to claim 17, wherein the selectively encrypted television program is a digital television program, and wherein the certain encrypted packets comprise packets that are needed to decode the television program if the duplicated packets sent in the clear are ignored.

19. The method according to claim 17, wherein the terrestrial broadcast selectively encrypted television program complies with a digital satellite service or digital cable transport standard, and wherein the encrypted packets carry a payload of a packetized elementary stream header.

20. A method of decoding selectively encrypted content, comprising:
   receiving selectively encrypted digital content wherein the selectively encrypted digital content contains duplicate packets of the selected packet type with one of the duplicate packets being encrypted while the other of the duplicated packets remains unencrypted the encrypted content comprising information needed for correct decoding of the selectively encrypted content if the duplicated unencrypted content is ignored; and
   decrypting the encrypted content under the encryption system to produce decrypted content.

21. The method according to claim 20, further comprising decoding the unencrypted content, ignoring the duplicated unencrypted content, and the decoding decrypted content to decode the selectively encrypted content.

22. The method according to claim 20, wherein the digital television content is broadcast using a signal that complies with a digital satellite service or digital cable transport standard, and wherein the encrypted packets carry a payload of a packetized elementary stream header.

23. The method according to claim 1, wherein the unencrypted packets carry a first continuity counter and wherein the encrypted packets carry a second continuity counter.

24. The method according to claim 1, wherein the first packets carry a first continuity counter and wherein the second packets carry a second continuity counter.

25. A television receiver according to claim 14, wherein the unencrypted packets carry a first continuity counter and wherein the encrypted packers carry a second continuity counter.

26. The method according to claim 17, wherein the unencrypted packets carry a first continuity counter and wherein the encrypted packets carry a second continuity counter.

27. The method according to claim 20, wherein the unencrypted packets carry a first continuity counter and wherein the encrypted packets carry a second continuity counter.

* * * * *